Sept. 6, 1960   C. VAN DER LELY ET AL   2,951,329
RAKING DEVICE

Original Filed Oct. 15, 1953   4 Sheets-Sheet 1

Sept. 6, 1960　　　C. VAN DER LELY ET AL　　　2,951,329
RAKING DEVICE

Original Filed Oct. 15, 1953　　　　　　　　　4 Sheets-Sheet 2

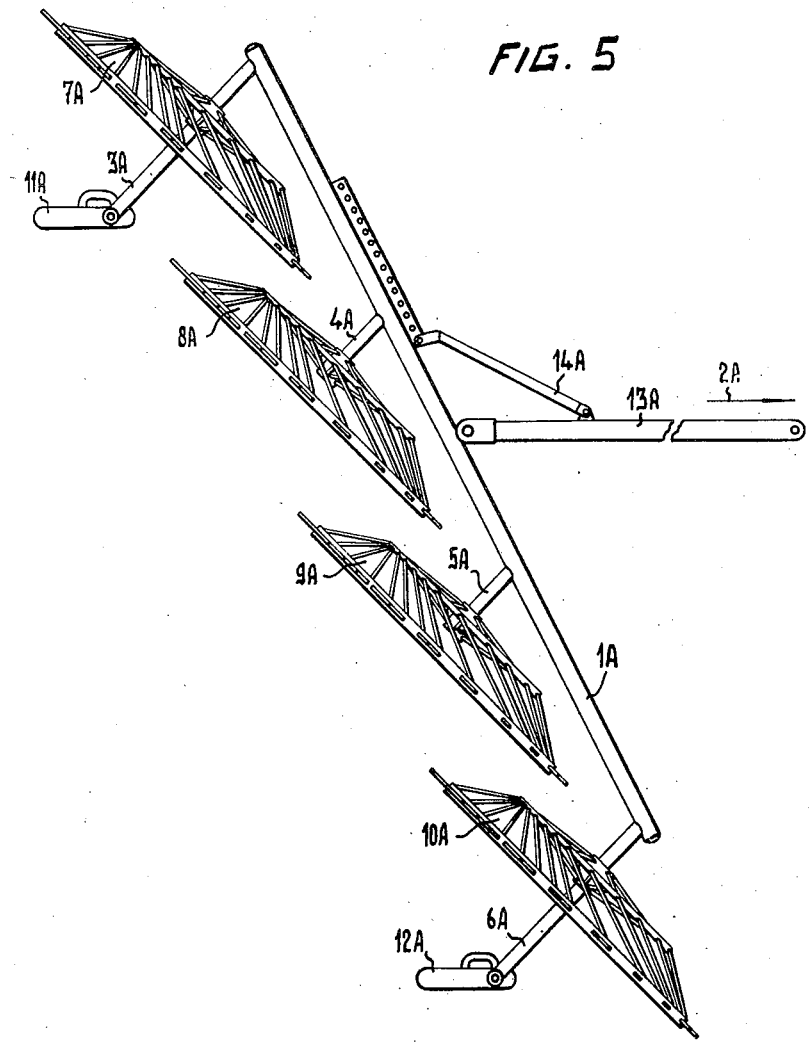

United States Patent Office 2,951,329
Patented Sept. 6, 1960

2,951,329
RAKING DEVICE

Cornelis van der Lely and Ary van der Lely, Maasland, Netherlands, assignors to C. van der Lely, N.V., Maasland, Netherlands, a Dutch limited company Continuation of application Ser. No. 386,278, Oct. 15, 1953. This application Nov. 19, 1958, Ser. No. 775,024

9 Claims. (Cl. 56—377)

This invention relates to a raking device, such as a side delivery rake, swath turner or the like, and more specifically to the type having a mobile frame with one or more rotatable raking members the raking members being rake wheels, drums, or similar means having a plurality of circumferential teeth or similar elements to engage rakeable substance. The raking members of such raking device are arranged at an angle to the direction of travel of the mobile frame and are rotated by contact with the ground or rakeable substance thereon.

Known raking devices of this type generally have only one working position—usually as a side delivery rake. Where additional working positions are provided, this is usually accomplished by rather complicated measures such as displacing the rake wheels or changing the positions of different frame parts on which the rake wheels are mounted.

It is an object of the present invention to provide a raking device with an uncomplicated frame which can be changed in a simple manner from one working position to another. This can be accomplished by the inversion of a properly designed raking device, the device having means for supporting the frame for ground traversing operations in both the "normal" as well as the "upside down" positions. It is desirable that the device be provided with rake wheels, the axles of which are rigidly secured to the frame.

Other objects, features, and details of the present invention will appear from the following description with reference to the accompanying drawings, in which an embodiment of the invention is shown by way of example.

This application is a continuation of the application Serial No. 386,278, now abandoned, filed October 15, 1953.

Figure 5 is a plan view similar to Figure 1 with the mobile frame turned upside down whereby the side delivery rake has been transformed into a teddering device.

Figure 1:
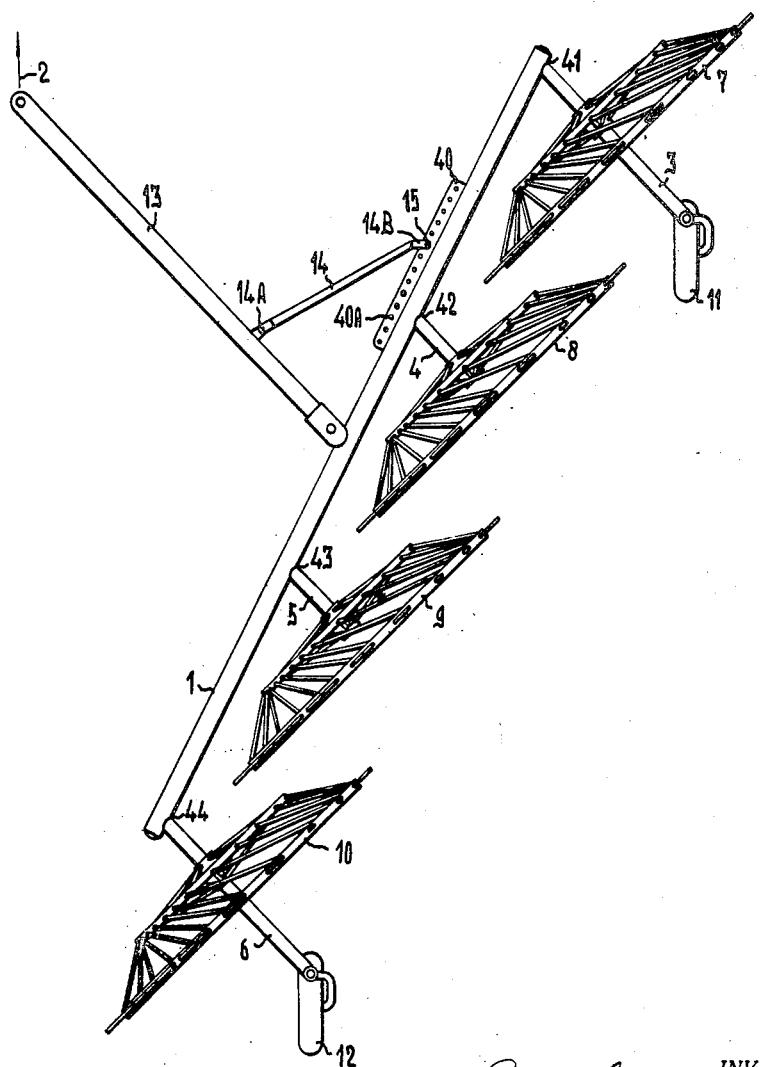
Figure 1 is a top plan view of a side delivery rake having four overlapping raking members mounted upon fixed axles.

Referring to Figure 1 of the drawings, the side delivery rake shown comprises a frame in the shape of a longitudinal beam 1 extending obliquely with regard to its normal direction of travel, as indicated by arrow 2. On the beam 1, four parallel laterally extending portions of axles 3, 4, 5, and 6 are rigidly secured at 41, 42, 43, and 44. The axles 3, 4, 5, and 6 extend substantially horizontally and each carries a rotatable raking member 7, 8, 9, and 10, respectively. Axle 3 carries a running wheel 11 and axle 6 carries a running wheel 12. Said wheels, 11 and 12, support the frame and maintain it at a predetermined height above the ground. The wheels 11 and 12 are preferably self-adjusting or swivel wheels which may be locked in position, it being understood that suitable means for locking the wheel in position may be employed.

To the beam 1 is hingedly connected an adjustable draw arm 13 which may be pivoted in a substantially horizontal plane and may be locked in its operative position by means of bar 14 hingedly connected to the arm 13 at point 14A and having at its free extremity an aperture 14B which may be put above one of the corresponding apertures 40A of the member 40 secured to the beam 1. Through the corresponding apertures 40A and 14B there is inserted a locking pin 15.

The raking members 7, 8, 9, and 10 are substantially as shown in Patent No. 2,851,846. Each of the raking members 7, 8, 9, or 10 comprises a hub A, a substantially rigid part B and a flexible circumferential part C (see Figure 2). The hub A comprises a bushing 16 provided with linings and constituting a bearing for the axle carrying the raking member. Said bushing 16 carries at one end a fixed collar 17 and a screw thread 18 at the other end. A collar 20, of the same shape as collar 17, is screwed upon the screw thread 18 in order to lock the bushing 19, after which the collar 20 is secured against rotation.

The outer bushing 19 carries a collar at each of its ends. Each of said collars 21 and 22 is provided with a series of openings 23 and 24, respectively, of which the center lines are parallel to the center line of the hub.

In the embodiment shown, the rigid central portion B and the flexible circumferential portion C are constituted by a set of spokes 25, 26, 27, and 28, which have been bent at their outer ends to form the raking elements extending beyond the portion C.

Figure 2:
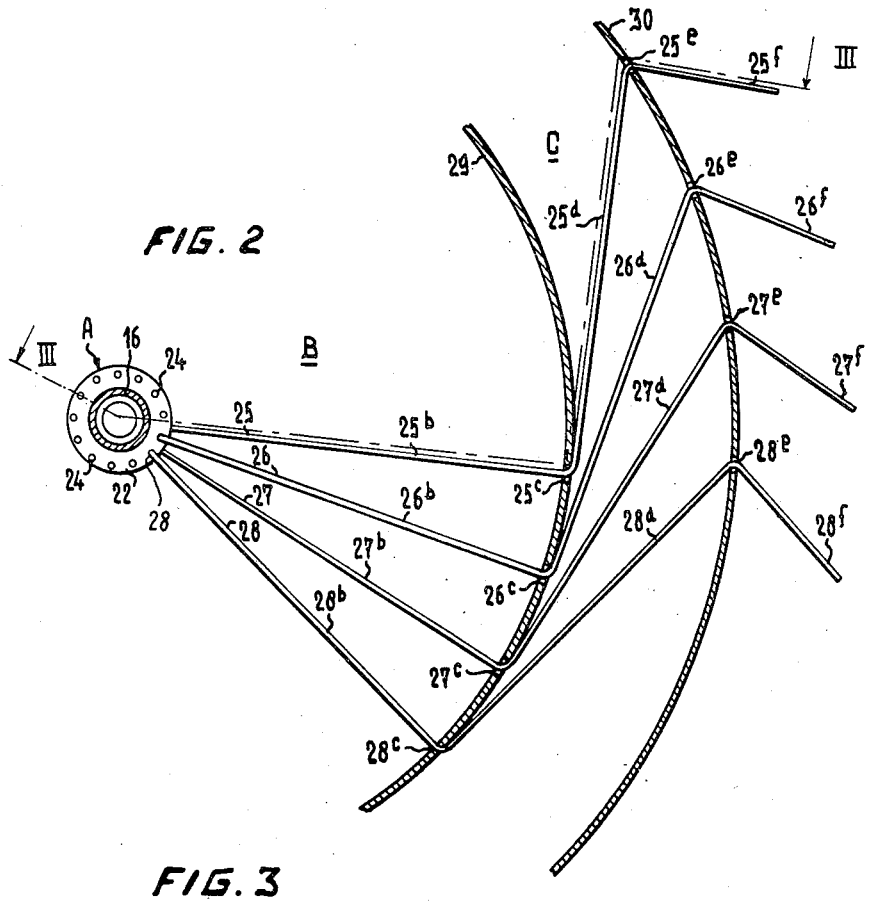
Figure 2 is a vertical sectional view of a portion of a raking member through section line II—II of Figure 3.

In Figure 2, only four spokes 25, 26, 27, and 28 have been shown. The spoke 25 comprises a hook-shaped inboard extremity 25a introduced into one of the openings 23 of the collar 21, a part 25b extending towards an inner rim 29, a part 25d located between the inner rim 29 and an outer rim 30, and a raking tooth or raking element 25f. Where part 25b joins part 25d, the spoke passes through a hole 25c in the inner rim 29. At the foot of the raking tooth 25f, the spoke passes through hole 25e in the outer rim 30. The raking tooth 25f is substantially at right angles to the spoke part 25d, said spoke part 25d being in Figure 2 nearly tangent to the inner rim 29. Parts of spokes 26, 27, and 28 are designated in Figure 2 in a similar manner to those of the spoke 25.

Figure 3:
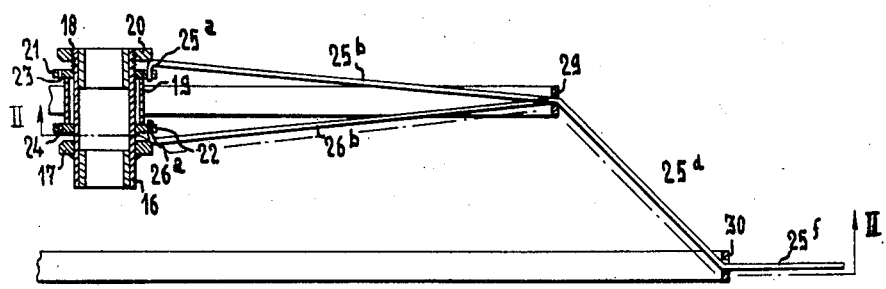
Figure 3 is a horizontal section of the raking member through section line III—III in Figure 2.

As appears from Figure 3, spoke parts 25d, 26d, 27d and 28d, constituting the circumferential portion C of the raking member, are located on a conical surface with the center line of hub A as an axis. Spoke parts 25b, 26b, 27b, and 28b, constituting the central portion B of the raking member, are alternately connected to the collar 21 and to the collar 22 of the hub A. Thus the spokes 25 and 27 run toward the collar 21 whereas spokes 26 and 28 run toward the collar 22. Consequently, spoke end 25a and the end of spoke 27 (not shown) are introduced into openings 23 whereas spoke ends 26a and 28a are introduced into openings 24. Due to the spreaded arrangement of the spoke ends thereby obtained, the central portion B of the raking member presents a great rigidity and a great resistance against lateral deflection. The circumferential portion C is, however, adapted to deflect readily out of its conical plane. Upon lateral deflection of the outer rim 30, the spoke parts 25d, 26d, 27d and 28d will turn about spoke parts 25b, 26b, 27b, and 28b, respectively, the latter spoke parts being twisted. Since, in the same manner, the raking teeth 25f, 26f, 27f, and 28f are also able to deflect laterally, and spoke parts 25d, 26d, 27d, and 28d will be twisted, the raking teeth will always be maintained in a favorable raking position independent of lateral deflections of the circumferential portion C.

It has been found in practice that, due to the easily deformable portion C of the raking member and the special construction of the teeth, the raking member adapts itself perfectly to uneven terrain in spite of the fact that the raking member is mounted on a fixed axle.

Figure 4:
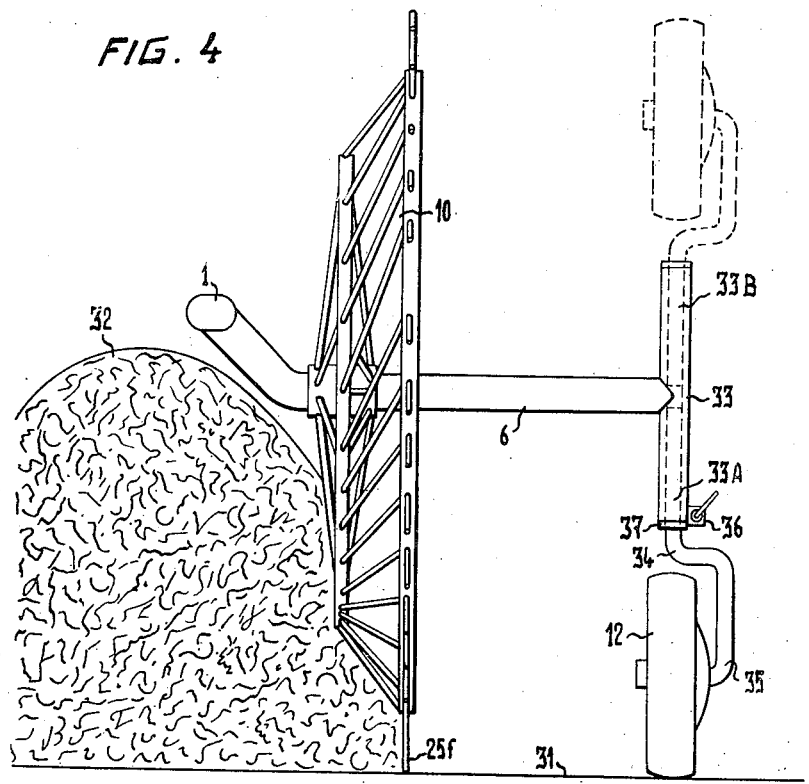
Figure 4 is a partial side elevation on an enlarged scale with a detachable running wheel for supporting the frame.

Referring to Figure 4 of the drawing, it will be seen that the axle 6 upon which raking member 10 is rotatably mounted is situated at a somewhat lower elevation above the ground 31 than beam 1 of the frame to which axle 6 has been rigidly secured. This elevation is such that upon even terrain tooth 25f touches the ground very slightly at its outer extremity. Since the raking member is obliquely arranged with regard to the direction of travel of the device, the member is put into rotation by coming into contact with the ground or rakeable substance 32 thereon. The axle 6 carries a connection member 33 extending both upwardly and downwardly and constituting at the lower portion and upper portion 33A and 33B, respectively, bearings for the vertical axle 34 which is integral with the horizontal axle 35 of the running wheel 12. The lower end of member 33 is provided with locking means 36 to secure running wheel 12 in the desired position corresponding to the direction of travel of the side delivery rake. Any appropriate locking means of the mechanical arts can serve for this purpose such as is accomplished with respect to clamp split collar 145 in Patent No. 1,469,226. The vertical axle 34 is provided with a collar 37 which may be adjustable in height and which abuts against the lower tubular end of the member 33. Any appropriate collar well known to the art which is capable of vertical adjustment may be employed for this purpose. Patent No. 309,142 is an example.

The described construction has the advantage that the side delivery rake may be transformed into a teddering device by merely turning it upside down. The rake so turned is illustrated in Figure 5 wherein corresponding parts of the rake are designated by the same reference numerals as Figure 1 with the letter "a" added. The running wheel 12 has to be disconnected from the lower end of member 33 and introduced into the upper end of said member (see dotted lines in Figure 4). The same is done for running wheel 11. The draw arm 13 is swung into position 13a, shown in Figure 5, and locked in this position. When the rake is now moved in the direction of arrow 2a, the device operates as a teddering device.

It will be understood that in position as a side delivery rake (Figure 1) running wheel 12 is preferably locked in position by the locking means 36 and running wheel 11 is permitted to adjust itself freely; i.e. to operate as a swivel wheel. In position as a teddering device (Figure 5) the running wheel 11a is preferably locked in position with running wheel 12a adapted to adjust itself freely and to operate as a swivel wheel. Thus connection member 33 for the running wheel 12 requires locking means 36 only at its lower end, whereas the connection member for running wheel 11 needs only a locking means at its upper end.

It is evident that if desired connection member 33 may be provided with a running wheel at each of its ends. Member 33 may also be mounted on axle 6 so that member 33 may be turned about the center line of axle 6 with locking means provided for securing member 33 in positions either for raking or teddering operations.

In the transformation into a teddering device, raking members 7, 8, 9, and 10 remain unchanged upon their respective rigid axles.

The above description and drawings disclose a single embodiment of the invention and specific language has been employed in describing the figures. It will, nevertheless, be understood that no limitations of the scope of the invention are thereby contemplated, and that various alterations and modifications may be made as would occur to one skilled in the art to which the invention relates.

We claim:

1. A rake for the side delivery and teddering of hay or similar material comprising a substantially horizontally disposed frame having a plurality of axles rigidly secured thereto, a plurality of rake wheels rotatably mounted on said axles and arranged in an echelon on said frame, at least one downwardly extending connection member having ground supporting means attached to its lower portion, said downwardly extending connection member being interconnected to said frame, at least one upwardly extending connection member, said upwardly extending connection member being adapted for attachment of ground supporting means in its upper portion for use when the rake is inverted, said upwardly extending connection member being interconnected to said frame.

2. A rake comprising a frame having a draft means connected thereto and at least two raking wheels operatively associated therewith, at least one of said rake wheels being mounted on a laterally extending portion of said frame, the terminal portion of said laterally extending portion comprising a substantially vertically arranged connection member having a running wheel attached to its lower portion, the upper portion being adapted to receive said running wheel when said rake is inverted.

3. A rake comprising a substantially uniplanar frame having a draft means connected thereto and at least two raking wheels operatively associated therewith, at least one of said rake wheels being mounted on a laterally extending portion of said frame, the terminal portion of said laterally extending portion comprising a connection member having an upwardly extending part and a downwardly extending part with a running wheel attached to said downwardly extending part, the upwardly extending part being adapted to receive a running wheel when said rake is inverted.

4. A rake comprising a frame having draft means connected thereto, a plurality of axles rigidly secured to said frame, a plurality of rake wheels rotatably mounted on said axles and arranged in an echelon on said frame, a substantially vertically arranged connection member having ground supporting means attached to its lower portion, the upper portion being adapted to receive ground supporting means when the rake is inverted, said connection member being attached to the terminal end of one of said axles.

5. A rake according to 4 wherein said ground supporting means comprises a running wheel.

6. A rake according to 4 wherein said frame and said axles lie in substantially the same horizontal plane.

7. A rake according to 4 wherein said frame is located in front of said rake wheels and at a level higher than the centers of said rake wheels.

8. A rake for both teddering and side delivery operations comprising a frame having draft means connected thereto, parallel axles extending from said frame, an echelon of rake wheels mounted on said axles, a downwardly extending supporting member connected to said frame and providing support for said rake in an upright position, and an upwardly extending supporting member connected to said frame which will provide support for said rake when placed in an upside down position.

9. A rake according to 8 wherein said upwardly extending member and said downwardly extending member comprise a single part.

References Cited in the file of this patent

UNITED STATES PATENTS 720,098    Bamford _____ Feb. 10, 1903

OTHER REFERENCES

Information Circular #4, May 1951, North Carolina State College Agricultural Experiment Station, page 7.